(12) United States Patent
Navarro-Sorroche et al.

(10) Patent No.: US 10,502,861 B2
(45) Date of Patent: Dec. 10, 2019

(54) LONG-LIFETIME, HIGH-YIELD, FAST NEUTRONS SOURCE

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/366,930

(22) Filed: Mar. 27, 2019

(65) Prior Publication Data

US 2019/0219731 A1 Jul. 18, 2019

Related U.S. Application Data

(63) Continuation of application No. 15/754,259, filed as application No. PCT/US2015/060081 on Nov. 11, 2015, now Pat. No. 10,288,763.

(51) Int. Cl.
*G01V 5/10* (2006.01)
*E21B 47/00* (2012.01)
*E21B 49/00* (2006.01)

(52) U.S. Cl.
CPC .............. *G01V 5/107* (2013.01); *E21B 47/00* (2013.01); *E21B 49/00* (2013.01); *G01V 5/10* (2013.01)

(58) Field of Classification Search
CPC .......... G01V 5/107; G01V 5/10; E21B 49/00; E21B 47/00
USPC ..................................................... 250/269.4
See application file for complete search history.

(56) References Cited

U.S. PATENT DOCUMENTS

| | | | | |
|---|---|---|---|---|
| 3,756,682 A | * | 9/1973 | Frentrop | H01J 27/02 445/40 |
| 4,119,858 A | * | 10/1978 | Cranberg | H05H 3/06 376/116 |
| 4,841,556 A | * | 6/1989 | Kato | H05G 2/003 315/111.21 |
| 4,996,017 A | | 2/1991 | Ethridge | |
| 6,297,507 B1 | | 10/2001 | Chen et al. | |
| 2009/0135982 A1 | | 5/2009 | Groves | |
| 2011/0169492 A1 | | 7/2011 | Groves | |

(Continued)

FOREIGN PATENT DOCUMENTS

WO 2009148648 A1 12/2009
WO 2015102607 A1 7/2015

OTHER PUBLICATIONS

International Search Report and Written Opinion dated Aug. 9, 2016; International PCT Application No. PCT/US2015/060081.

*Primary Examiner* — David P Porta
*Assistant Examiner* — Gisselle Gutierrez
(74) *Attorney, Agent, or Firm* — McGuireWoods LLP

(57) ABSTRACT

A neutron generator includes a gas control interface and a vacuum chamber coupled to the gas control interface. The neutron generator also includes a target rod disposed within the vacuum chamber and having a longitudinal axis aligned with a central axis of the vacuum chamber, and further including a target disposed on a surface of the target rod facing the getter. The neutron generator also includes a planar ion source adjacent to the gas control interface and disposed between the target and the gas control interface. The planar ion source includes an array grid that is offset from the target and generally perpendicular to the longitudinal axis of the target rod.

20 Claims, 6 Drawing Sheets

(56) References Cited

U.S. PATENT DOCUMENTS

| | | |
|---|---|---|
| 2015/0155127 A1 | 6/2015 | Fink |
| 2015/0181688 A1 | 6/2015 | Perkins |
| 2015/0189731 A1 | 7/2015 | Groves |
| 2016/0216400 A1 | 7/2016 | Navarro-Sorroche |
| 2016/0231457 A1 | 8/2016 | Navarro-Sorroche |
| 2016/0295678 A1 | 10/2016 | Navarro-Sorroche |
| 2017/0040075 A1 | 2/2017 | Tang |
| 2017/0271037 A1 | 9/2017 | Navarro-Sorroche |
| 2018/0049305 A1 | 2/2018 | Navarro-Sorroche |

* cited by examiner

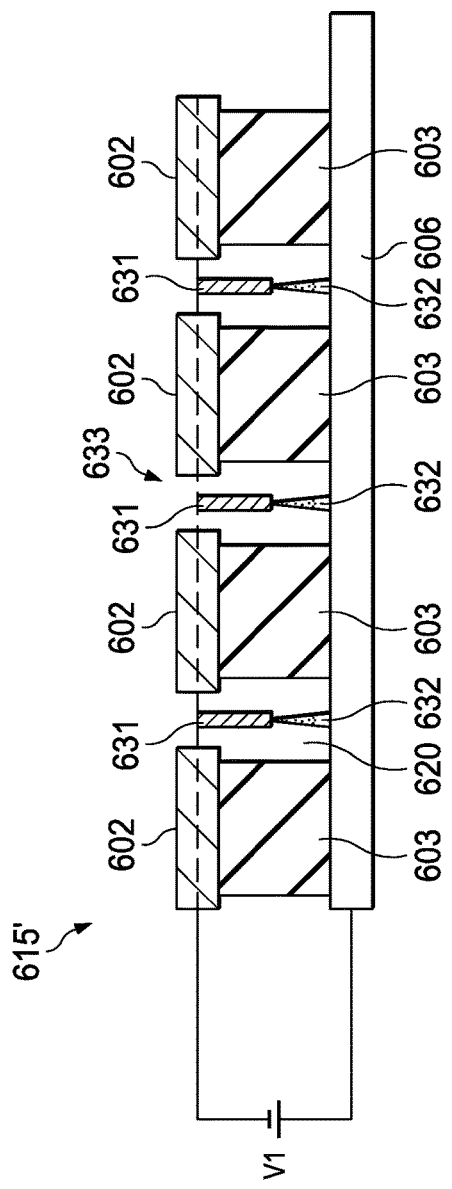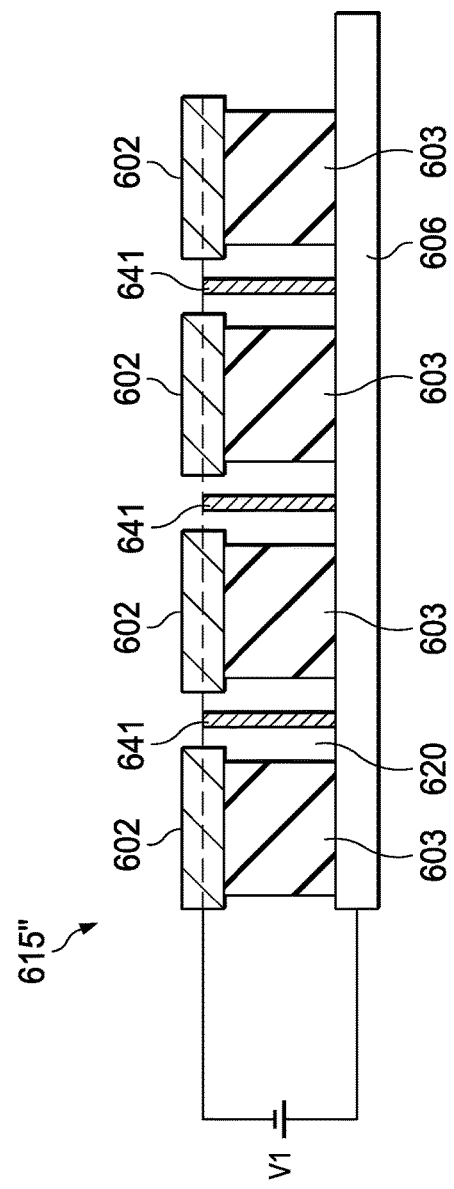

LONG-LIFETIME, HIGH-YIELD, FAST NEUTRONS SOURCE

CROSS-REFERENCE TO RELATED APPLICATIONS

This application is a continuation of U.S. patent application Ser. No. 15/754,259 filed on Feb. 21, 2018, which is a 371 of International PCT application no. PCT/US2015/060081, filed Nov. 11, 2015 both of which are incorporated herein by reference.

BACKGROUND

1. Field

The present disclosure relates to oil and gas exploration and production, and more particularly to a source of neutrons used in measurement while drilling and logging while drilling applications.

2. Description of Related Art

Wells are drilled at various depths to access and produce hydrocarbons such as oil and gas from subterranean geological formations. Particularly, hydrocarbons may be produced from a wellbore that traverses one or more subterranean formations.

In the process of completing such a wellbore, modern drilling operations may include gathering information relating to the conditions encountered downhole. Such information typically includes characteristics of the formations traversed by the borehole, and data relating to the characteristics of the borehole itself. The collection of information can be performed by several methods, including wireline logging, logging while drilling (LWD), measurement while drilling (MWD), drill pipe conveyed logging, and coil tubing conveyed logging.

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various formation characteristics are measured and correlated with the position of the sonde in the borehole as the sonde is pulled uphole toward the surface.

In LWD or MWD, a drilling assembly includes sensing instruments that measure various parameters of the formation during drilling. While LWD and MWD techniques allow formation measurements to be taken during drilling, drilling operations may create an environment that is hostile to electronic instrumentation or sensor operations.

In drill pipe conveyed logging or coil tubing conveyed logging, logging instruments are mounted on a tubing string that moves the instrument through an existing borehole. The tubing string enables logging of horizontal wellbores without subjecting the logging instruments to the drilling environment.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 6A through 6C show alternative embodiments of field ionization (FI) arrays.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The present disclosure relates to a neutron generator that may be used in wireline, MWD, LWD, and other logging operations. The neutron generator uses a field ionization array grid to provide a planar ion source that generates a transverse ion beam, resulting in enhanced lifespan and neutron yield. The neutron generator may be a pulsed neutron generator.

Figure 1:
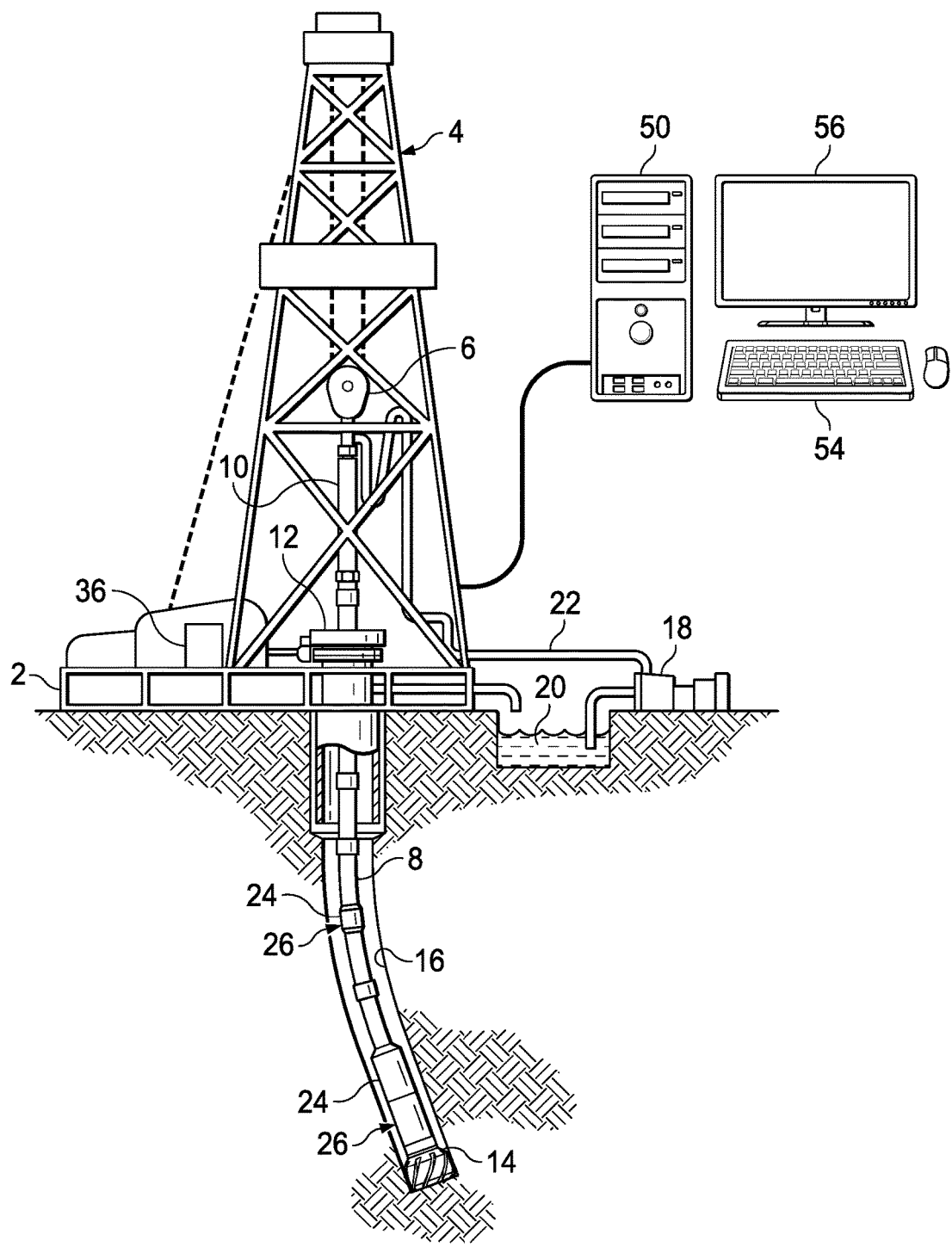
FIG. 1 is a schematic, side view of a logging while drilling (LWD) environment in which a logging tool that includes a neutron generator is deployed.

The disclosed neutron generator and associated systems and methods are described in the context of the larger systems in which they operate. Accordingly, FIG. 1 shows an illustrative logging while drilling (LWD) environment. In FIG. 1, a drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As drill bit 14 rotates, it creates a borehole 16 that passes through various formations. A pump 18 circulates drilling fluid 20 through a feed pipe 22, through the interior of the drill string 8 to drill bit 14. The fluid exits the drill string 8 through the drill bit 14 and flows upward through the annulus around the drill string 8 to transport drill cuttings to the surface, where the fluid is filtered and recirculated.

The drill bit 14 may be just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, and various formation measurements. In an embodiment, such a logging instrument includes a pulsed neutron generator and capture device that creates a neutron capture log.

In addition to using sensors to determine formation measurements and other properties, other sensor equipment may be included either in the drill collars or anywhere along the drill string 8 to collect information about the geological formation that is being drilled. Thus, an illustrative logging tool that includes a neutron generator, such as LWD tool 24, may be positioned near the drill bit 14 or connected further up the drill string 8. The LWD tool 24 may include a signal generator and a receiver where the signal generator is the neutron generator and the receiver is a sensor for sensing reflected radiation.

Measurements taken by the LWD tool 24 may be stored in internal memory and/or communicated to the surface. To facilitate transmission to the surface, a telemetry sub 26 may be included with or near the tool 24 to maintain a communications link with the surface. The communications link may transmit, for example, mud pulse telemetry for transferring tool measurements to surface receivers and receiving commands from the surface. Other suitable telemetry techniques can also be used. For example, another telemetry that can be used is wireless telemetry in which signals are sent as electromagnetic waves through the Earth. Alternatively, the measurements can be converted into electronic pulses or digital or analog signals that are sent up a cable.

At the surface, a data acquisition module 36 receives the uplink signal from the telemetry sub 26 or directly from the logging tool or sensor. Module 36 optionally provides some preliminary processing and digitizes the signal. A data processing system 50 (shown in FIG. 1 as a computer) receives a digital telemetry signal, demodulates the signal, and displays the tool data or well logs to a user. Software governs the operation of system 50. A user interacts with system 50 and its software via one or more input devices 54 and one or more output devices 56.

Figure 2:
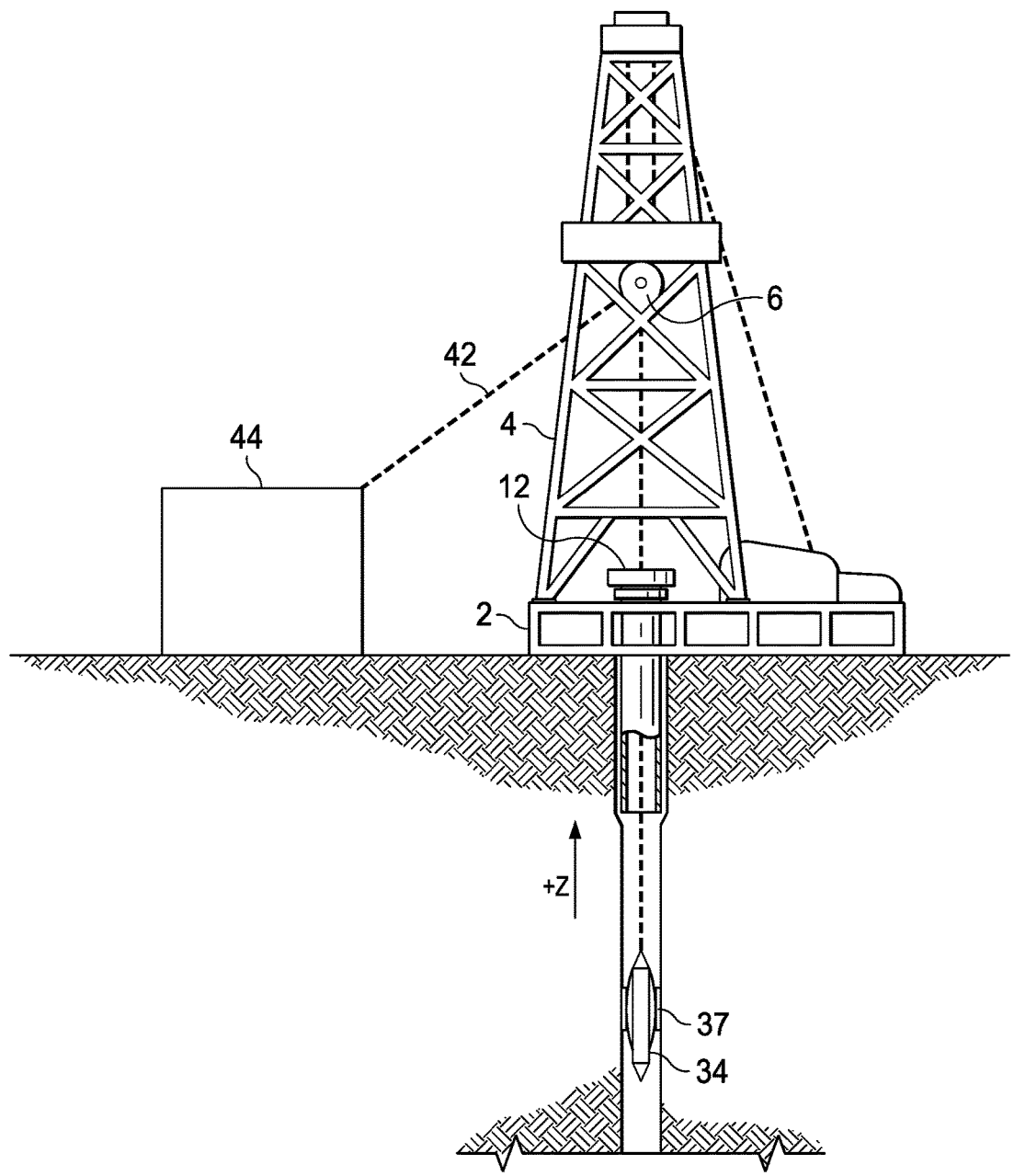
FIG. 2 is a schematic, side view of a wireline logging environment in which a logging tool that includes a neutron generator is deployed.

In a wireline system, the drill string 8 may be removed from the borehole and a wireline tool may be deployed as shown in FIG. 2. In FIG. 2 a drilling platform 2 supports a derrick 4 having a traveling block 6 for raising and lowering a wireline logging tool 34 that is lowered through the wellhead 12. The wireline logging tool 34 may be a sensing instrument or "sonde" suspended by a cable 42 having conductors for transporting power to the tool 34 and telemetry from the tool 34 to the surface. A logging portion of the logging tool 34 may have pads 37 that slide along the borehole wall as the tool is pulled uphole. A logging system 44 collects measurements from the logging tool 34, and includes computing facilities for processing and storing the measurements gathered by the logging tool 34. Like the tool 24 described with regard to FIG. 1, the logging tool 34 may contain a neutron generator either exclusively or in combination with other sensors and instruments.

While the drilling and wireline systems of FIGS. 1 and 2, respectively, are shown in land-based wells, such systems may be similarly deployed in a sub-sea well accessed by an offshore platform. The offshore platform may be a floating platform or may instead be anchored to a seabed.

Figure 3:
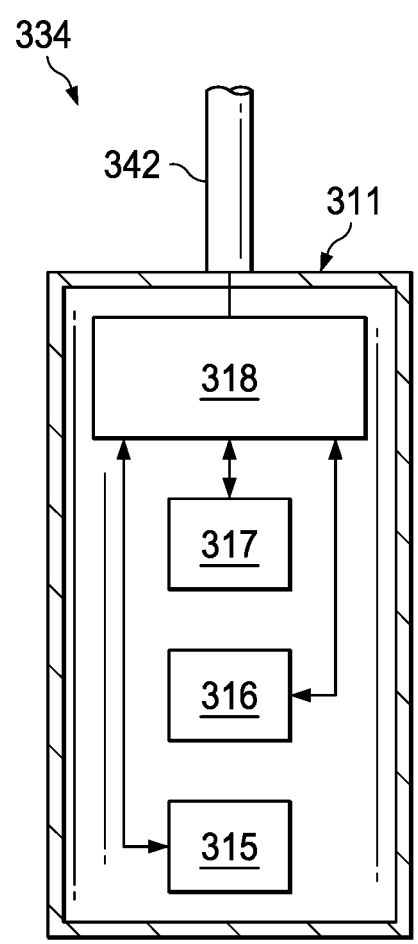
FIG. 3 shows a block diagram of a logging tool that includes a neutron generator.

FIG. 3 shows an exemplary embodiment of a logging tool 334, analogous to the logging tool 24 of FIG. 1 and the wireline logging tool 34 of FIG. 2. The logging tool 334 includes a neutron generator in addition to sensors and other hardware and software. The logging tool 334 may be suspended in a wellbore on an armored electrical cable 342, the length of which substantially determines the relative depth of the logging tool 334. The logging tool 334 may communicate with surface equipment, which may include a processor, a communication subsystem, and recorder. Processing of data gathered by the logging tool 334 can be performed downhole at or adjacent the logging tool 334, at the surface, at a remote location, or a combination thereof.

In an embodiment, the logging tool 334 includes a housing 311 in the shape of a cylindrical sleeve that is capable of running into an open wellbore, a cased wellbore, or production tubing. A neutron generator 315 is mounted in the logging tool 334 with a near-spaced radiation detector 316 and a far-spaced radiation detector 317 mounted longitudinally above the neutron generator 315. Each of the near-spaced radiation detector 316 and the far-spaced radiation detector 317 are positioned at a separate axial distance from the neutron generator 315. Alternatively, a single detector may be used, and the placement of the detectors may also be changed. For example, the near-spaced radiation detector 316 and the far-spaced radiation detector 317 may be in another location within the single body of the logging tool 334 or may be placed in one of the separate components of the logging tool 334. The logging tool 334 may include acquisition, control, and telemetry electronics 318 operable to control the timing of burst cycles of the neutron generator 315, the timing of detection time gates for the near-spaced radiation detector 316 and far-spaced radiation detector 317, and to transmit count rate and other data. The processor of the surface equipment can receive detected thermal neutron counts, detected epithermal neutron counts, and/or gamma ray spectral data from near and far radiation detectors 316 and 317. The signals can be recorded as a log representing measured parameters with respect to depth or time. The radiation detectors 316 and 317 may include a thermal neutron detector, an epithermal neutron detector, and a scintillation counter.

In some embodiments, the logging tool 334 that includes a neutron generator 315 can be used to take a thermal neutron porosity measurement. This measurement measures the slowing down and capture of neutrons between a source and one or more thermal neutron detectors. The logging tool 334 may also or alternatively be used for a pulsed neutron spectroscopy measurement. This is a measurement of the spectrum of gamma rays emitted by a formation bombarded with neutrons. Gamma ray emission occurs when the neutrons interact in the formation with different nuclei that emit characteristic gamma rays through inelastic neutron scattering, fast neutron reactions, and neutron capture. Different interactions in time are separately observable by neutron pulsing. For example, inelastic neutron scattering and fast neutron interactions occur soon after a neutron pulse, while the capture events occur later. The scattering and fast neutron interactions can therefore be separated to give an inelastic spectrum and a capture spectrum. The inelastic spectrum and capture spectrum are analyzed by counting gamma rays in windows placed at the main peaks for certain elements, comparing the inelastic and capture spectrums with spectral standards, and/or by combining the inelastic and capture spectrums using an alpha processing combining technique and then creating a resultant log, which may be, for example, a pulsed neutron spectroscopy log.

Figure 4:
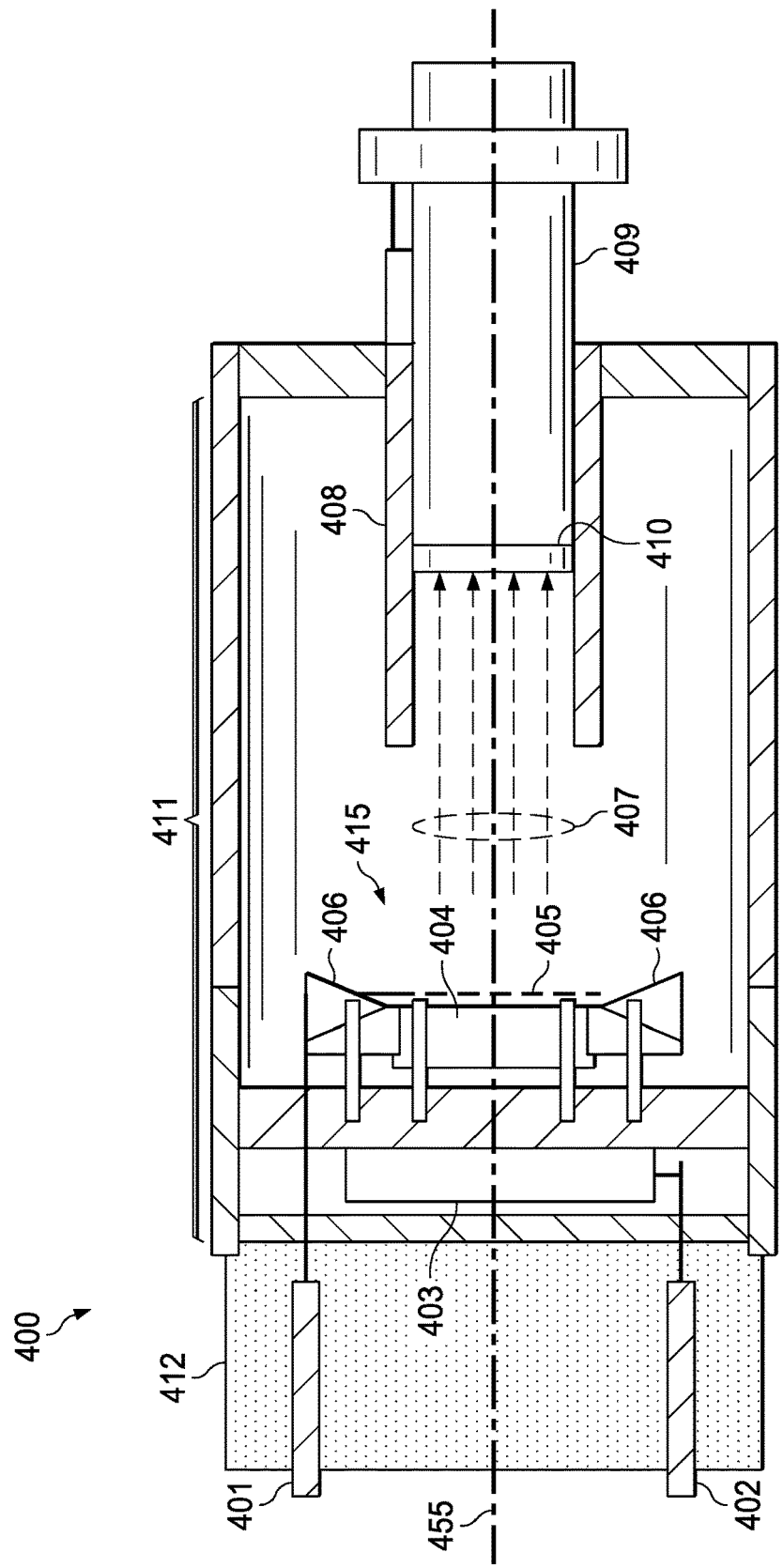
FIG. 4 shows a schematic, cross-section view of a neutron generator according to an illustrative embodiment.
Figure 5:
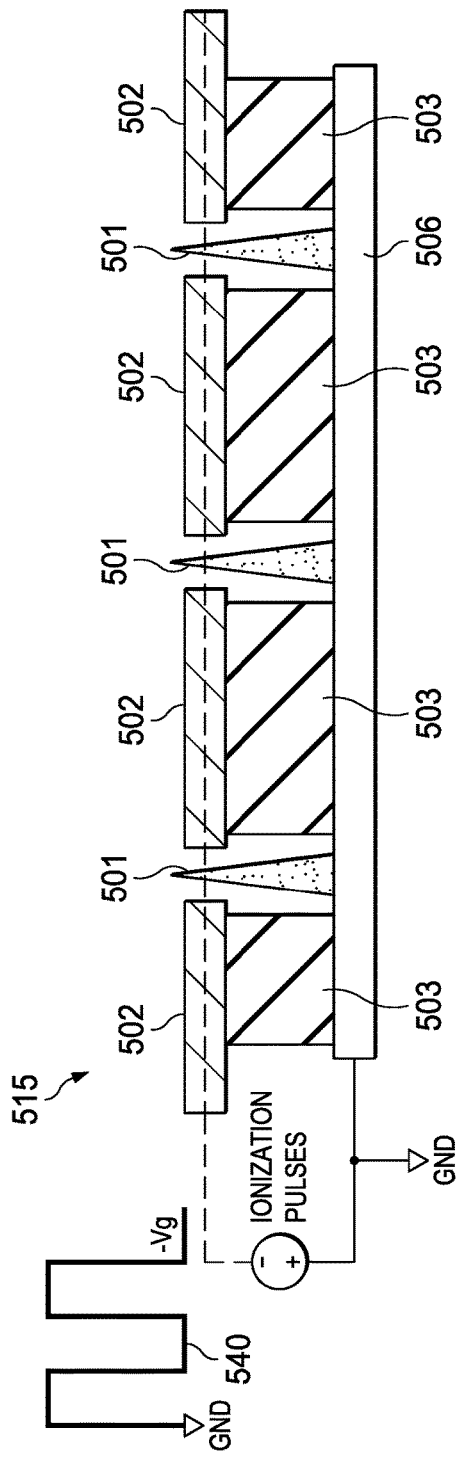
FIG. 5 shows a schematic, cross-section view of a field ionization (FI) array according to an illustrative embodiment.

Referring now to FIG. 4, an illustrative embodiment of a neutron generator 400 is shown that includes a housing that in turn includes head unit 412 and vacuum chamber 411. The vacuum chamber 411 includes a planar field ionization array 404 and a planar grid electrode 405 that, as described in more detail with regard to FIGS. 5 and 6A-6C, are assembled to form a planar ion source 415. The planar field ionization array 404 may include a substantially planar array of nano-tips separated by insulators on a substrate, as described in more detail below. The planar grid electrode 405 may be a substantially planar grid adjacent the planar field ionization array 404. The planar ion source 415 is a rigid planar structure that is positioned perpendicular to a central axis 455 of the neutron generator 400. The central axis 455 may also be called an axis of symmetry of the neutron generator 400. The planar ion source 415 is positioned at an end of the vacuum chamber 411 adjacent to the head unit 412. A target 410 and a target rod 409 are positioned at an opposite end of the vacuum chamber 411 from the head unit 412. The target 410 may be a titanium target and the target rod 409 may be a copper target rod coupled to a voltage source, which may be an ultra-high voltage source. The vacuum chamber 411 may be a generally cylindrical chamber, and the body of the neutron generator 400 may be made using suitable materials. Examples of suitable materials include a nickel-cobalt ferrous alloy such as, for example, Kovar and/or borosilicate glass. Here, borosilicate glass is a type of glass with silica and boron trioxide as the main glass-forming constituents, an example of which is Corning 7052 glass.

An ionization electrode 401 is positioned in the head unit 412 and a gas control electrode 402 may also be located, as shown, in the head unit 412. According to an embodiment, the ionization electrode 401 and the gas control electrode 402 are placed near and coupled to sources of electrical potential. The gas control electrode 402 is connected to a gas reservoir 403 disposed in the vacuum chamber 411 as shown in FIG. 4. The gas reservoir 403, which may also be referred to as a "getter", includes a filament inside of a small titanium sleeve that is coupled to the gas control electrode 402. The titanium sleeve is prefilled with deuterium and tritium gas during the manufacturing process. The gas reservoir 403 may be placed in close proximity to the planar ion source 415 that includes the planar field ionization array 404 and the planar grid electrode 405 within the vacuum chamber 411.

The ionization electrode 401 is electrically coupled to the planar grid electrode 405. The planar grid electrode 405 is disposed on the planar field ionization array 404 to form a planar ion source 415, and placed within the vacuum chamber 411 adjacent to and facing away from the gas reservoir 403. Thus, the planar ion source 415, which includes the planar grid electrode 405 and planar field ionization array 404, faces into the vacuum chamber 411 toward the target rod 409 that is disposed along the central axis 455 of the neutron generator 400. Additionally, the planar ion source 415 is oriented substantially perpendicular to the central axis 455 of the neutron generator 400 such that an ion beam 407 produced by the planar ion source will be substantially parallel to the central axis 455.

According to an embodiment, the target rod 409 is substantially cylindrical and is located in the vacuum chamber 411 of the neutron generator 400 at an opposite end to that of the gas reservoir 403 and planar ion source 415. The target rod 409 is arranged within the neutron generator 400 such that a longitudinal axis of the target rod 409 is aligned along the central axis 455 of the neutron generator 400. Accordingly, the target 410 is positioned to face toward the planar ion source 415 and to be substantially perpendicular to the central axis 455. The planar ion source 415 including the planar field ionization array 404 and the planar grid electrode 405 are axially aligned and substantially parallel to the target 410.

In some embodiments, the neutron generator 400 also includes a focusing component, which may be a focusing electrode 406 disposed along a periphery of the planar ion source 415. The focusing component is operable to adjust the extent to which an ion beam 407 generated by the planar ion source 415 diverges or converges from parallel (with respect to the central axis 455 of the neutron generator 400). The focusing electrode 406 is generally kept at ground potential and is formed at a small angle of approximately twenty-one degrees relative to the surface of the planar grid electrode 405 to compensate for dispersion of the ion beam 407 due to same charge repulsion during transport or other factors.

The target rod 409 may be partially surrounded by a suppressor 408, as shown in FIG. 4. The suppressor 408 can be made from a stainless steel such as type 304, 316, or 321, a ceramic material, or from a borosilicate glass made from at least silica and boron trioxide, an example of which is Corning 7052 glass. The suppressor 408 may also have a suppressor resistor that is connected to the suppressor 408.

In some instances, the area within the vacuum chamber 411 starting from the planar grid electrode 405 and extending along the central axis 455 to the target 410 can be referred to as a low pressure acceleration region of the vacuum chamber 411. The low-pressure acceleration region has a pressure that is lower than a pressure near the planar ion source 415. The pressure difference helps accelerate ions that are being generated away from the planar ion source 415. In addition to the pressure difference, extraction and acceleration may also be helped by an ultra-high voltage applied to the target rod 409. The foregoing components are arranged such that ions extracted by the planar ion source 415 will be accelerated into a perpendicular ion beam 407 that runs parallel to the central axis 455.

In an embodiment, the neutron generator 400 uses the planar ion source 415 to generate ions from deuterium and tritium gas from the gas reservoir 403 in the vacuum chamber 411 of the neutron generator 400. The direct ionization is accomplished using the planar field ionization array 404 that has a circular bundle of nano-emitters, which may also be referred to as nano-tips, as described in more detail with regard to FIGS. 5-6C. The planar field ionization array 404 may form a grid that is centered about and perpendicular to the central axis 455 of the cylindrical vacuum chamber 411 of the neutron generator 400.

The planar ion source 415 placed in the neutron generator 400 may produce a predominantly monatomic deuterium and tritium ion beam 407. The ions in the ion beam 407 have a preferred transport characteristic in that they travel parallel to the central axis 455 from the ions' point of excitation toward the target 410 providing a planar source of ions. In addition to providing preferable transport characteristics, this arrangement improves the overall ionization efficiency, resulting in an order of magnitude increase in the neutron yield and more than double the lifetime of conventional neutron generator tubes.

In an illustrative embodiment of a neutron generator, a planar ion source is provided that ionizes gas in close proximity to nano-tips to create a substantially planar plasma surface. This further results in the generation of a perpendicular ion beam emanating therefrom, as shown in FIG. 4. By providing a rigid planar structure that acts as the ion source, many complexities and difficulties are mitigated or avoided entirely. Specifically, such a planar plasma surface provides for an ion beam having almost no convergence and minimal divergence, thereby more uniformly covering the entire surface of a target than conventional ion sources.

FIGS. 5 and 6A-6C illustrate a variety of configurations of a planar ion source that may be included within a neutron generator. According to the embodiment of FIG. 5, a planar ion source 515 includes a substrate 506, one or more field ionization grid electrodes 502, which may also be called grid electrodes 502, and a corresponding one or more field ionization insulators, which may be referred to as insulators 503. The insulators 503 are positioned between the substrate 506 and each of the one or more grid electrodes 502. Additionally, the planar ion source 515 also includes one or more nano-tips 501 distributed in between each insulator 503 and grid electrode 502 pair. Gridded in two directions, to form a substantially planar grid, the grid electrodes 502 form a portion of a field ionization array grid, for example the planar grid electrode 405 of FIG. 4. Further, the planar ion source 515 of FIG. 5 includes the substrate 506, nano-tips 501, and the insulators 503 which together correspond to the planar field ionization array 404 of FIG. 4. The nano-tips 501 may be directly connected to the substrate 506 and may extend away from a surface of the substrate 506.

Figure 6A:
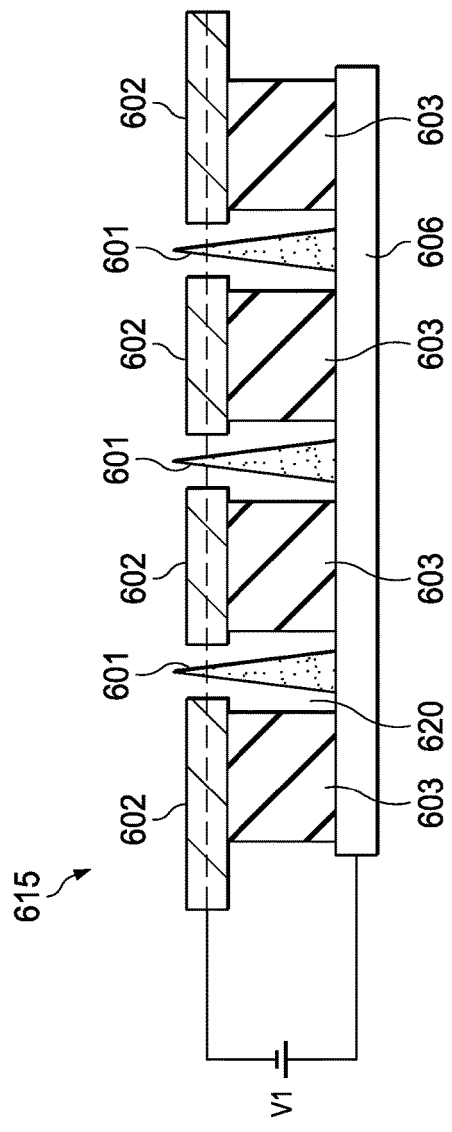

Other examples of field ionization arrays with different field ionization (FI) nano-tip arrangements are depicted in FIGS. 6A-6C. In the embodiment of FIG. 6A, the planar ion source 615 comprises a plurality of nano-tips 601 that are spaced apart and attached to substrate 606. The plurality of nano-tips 601 may be made from tungsten, molybdenum, silicon, chromium, carbon, a nickel-based material, or any other suitable material or combination thereof, and may be formed by depositing the selected material on a circular substrate 606 having a diameter that is approximately the same as the diameter of the target rod 409, as shown in FIG. 4.

The planar ion source 615 is formed in a planar and circular arrangement with nano-tips 601 directed toward a target 410, as shown in FIG. 4. Additionally, as shown in FIG. 6A, field ionization grid electrodes are interspaced between the nano-tips 601. The field ionization grid electrodes may also be referred to as gate electrodes 602. The gate electrodes 602 are spaced and isolated from the substrate 606 by insulators 603. An ionizable gas 620 is present in an area in close proximity of the nano-tips 601. The ionizable gas 620 is, for example, a deuterium and tritium mixture at an adjustable vacuum pressure. The spacing between nano-tips 601 and gate electrodes 602 is selected such that an ionization voltage V1 between gate electrodes 602 and nano-tips 601 acts to generate ions from ionizable gas 620.

In another embodiment, planar ion source 615 may be formed in several lengthwise planar strips that are attached between the gas reservoir 403 and a target rod 409 in the vacuum chamber 411. The lengthwise planar strips may be sized and arranged to cover an opening in the gas reservoir 403 leading into the vacuum chamber 411. The lengthwise dimension of the lengthwise planar strips is arranged such that the lengthwise planar strips are perpendicular to an axis of symmetry along which an ion beam 407, as shown in FIG. 4, will propagate. The nano-tips 601 that are disposed on the lengthwise planar strip extend perpendicular to the planar surface of the lengthwise planar strip pointing toward the target 410 and target rod 409.

FIG. 6B shows a cross-section of an alternative embodiment of a planar ion source 615'. In the embodiment of FIG. 6B, a composite nano-tip 633 includes a tungsten base 632 attached to substrate 606 and a carbon nano-tip 631 molecularly formed on the end of tungsten base 632. FIG. 6B also shows a similar arrangement to FIG. 6A where gate electrodes 602 are disposed between composite nano-tips 633 and isolated from the substrate 606 by insulators 603. FIG. 6C shows another example of a planar ion source 615" having nano-tips formed by carbon nano-tubes 641. The carbon nanotubes 641 are attached to substrate 606 in a manner similar to the nano-tips described with regard to FIGS. 6A and 6B.

In operation, a neutron generator, such as the neutron generator 400 of FIG. 4, generates neutrons by applying a low amplitude voltage to the gas control electrode 402 that heats a filament that is part of the gas reservoir 403. The heating of the filament causes the gas reservoir 403 to release a calibrated amount of deuterium and tritium (D/T) gas corresponding to the temperature of the gas reservoir 403. This heating can be used to control the deuterium and tritium gas pressure in the vacuum chamber 411, which may be viewed as a function of the current applied to the gas control electrode 402 or the corresponding gas output from the gas reservoir 403. For example, increasing the current applied to the gas control electrode 402 and the gas reservoir 403 helps increase the rate of release of deuterium and tritium gas, in turn increasing deuterium and tritium gas pressure.

A voltage pulse of appropriate amplitude is then applied to the ionization electrode 401 that is connected to the planar grid electrode 405 of the planar ion source 415. In some embodiments the voltage pulse may be a negative voltage pulse. This creates an electric field on the order of, for example, 20 v/um between the planar grid electrode 405 and the planar field ionization array 404 of the planar ion source 415 causing ionization of the deuterium and tritium gas and generating an ion beam 407. The deuterium and tritium gas that is in close proximity to the planar field ionization array is thereby ionized. The ion beam 407 is projected, and may be focused by a focusing component, in a direction that is parallel to the central axis 455 of the neutron generator 400. The ion beam 407 may then be accelerated toward the target 410 by an ultra-high voltage applied to the target rod 409, causing ions in the ion beam 407 collide with the deuterium and tritium nuclei in the target 410. This collision produces a deuterium ion on deuterium target or a deuterium ion on tritium target nuclear fusion reaction that generates high energy neutrons.

In the foregoing embodiments, the planar ion source may be consistent with any circular planar ion sources such as ion sources 515, 615, 615', 615" described with regard to FIGS. 5 and 6A-6C. Operationally, as specifically shown in FIG. 5, the field ionization grid electrode 502 receives a voltage pulse 540 that is used to generate an ion beam. The voltage pulse 540 may have a negative polarity with respect to the substrate 506. Thus, the planar ion source 515 acts as a planar, thin layer generator of ions. The generated ions can be accelerated toward the target 410 by applying an electric field of proper polarity and amplitude to the target 410 along with careful control of vacuum conditions and gas pressure.

In some embodiments, the disclosed planar ion source 415 results in the neutron generator 400 producing higher than 50% monatomic ions, a higher neutron yield (approximately $10^9$ n/s), and a longer lifetime (approximately 2×) as compared to some conventional neutron generators.

It is noted that neutron yield of a neutron generator, for example the neutron generator 400 as shown in FIG. 4, can be limited by a number of factors, including ion extraction efficiency and changes in the ion beam coverage of the target 410. Power dissipation of the target rod 409 and thermal desorption of deuterium and tritium at the titanium layer may also affect the neutron yield. By using one of the planar ion sources 615, 615', 615" a consistent ion beam 407 is created that provides even and consistent coverage of the entire surface of the target 410 adjacent to the target rod 409 providing for an even, consistent, and maximized deuterium and tritium fusion reaction to take place.

In accordance with the foregoing systems and methods, a neutron generator, for example the neutron generator 400 as shown in FIG. 4, is disclosed that is compact and sealed. The neutron generator may provide a pulsed source of 14.1 MeV neutrons based on the $_1^2H + _1^3H \rightarrow _2^4He + _0^1n$ nuclear reaction. The neutron generator 400 provides a high intensity source of fast neutrons for reducing logging statistics by as much as 10 times allowing for faster logging speed and reducing the operating rig time. The neutron generator 400 also reduces the electromechanical complexity of the high yield accelerator neutron source by using a planar ion source.

It is noted that a neutron generator, for example the neutron generator 400 as shown in FIG. 4, implemented using a planar ion source similar to those described above for directly ionizing the deuterium and tritium gas offers several benefits as compared to some conventional neutron generators. For example, (a) sub-microseconds on/off switching time may be provided by including a controller operable to switch the neutron generator between an on state and an off state at a switching time of less than 1 micro second, (b) high (>50%) monatomic, positive deuterium and tritium ions beam composition may be provided, (c) high (~5×$10^8$n/s) neutron yield may be achieved, and (d) high (~2×) neutron generator lifetime may be provided. A neutron generator 400 as described above and shown can have a neutron yield of more than $10^9$ neutrons per second (n/s) from the deuterium ion on tritium target 409 fusion reaction. Additionally, by using a planar ion source 615, 615', 615" to directly ionize the deuterium and tritium gas, the composition of the ion beam 507 may be at least 50% monatomic ions. The large percentage of monatomic deuterium and tritium ions increases the output n-yield of the neutron generator by a similar amount. In addition, by using one of the circular planar ion sources 615, 615', 615" as a planar source of deuterium and tritium ions, the divergence/convergence of the ion beam 407 is rendered negligible.

In accordance with the foregoing embodiments, an illustrative method of manufacturing a neutron generator includes providing a housing that includes a head unit and a vacuum chamber. The method further includes disposing a gas reservoir and a target rod within the vacuum chamber. The target rod has a longitudinal axis aligned with a central axis of the vacuum chamber, and a target is positioned on a surface of the target rod that faces the gas reservoir. The method further includes positioning a planar ion source adjacent to the gas reservoir and between the target and the gas reservoir. The planar ion includes a planar field ionization array that is offset from the target and perpendicular to the longitudinal axis of the target rod, and a planar grid electrode is disposed on the planar field ionization array facing the target.

In some embodiments, a gas control electrode is coupled to a heat filament disposed within the gas reservoir to generate deuterium gas and tritium gas by controlling temperature. In addition, an ionization electrode is electrically coupled to the planar grid electrode operable to generate an electric field resulting from the application of a negative voltage being applied to the planar grid electrode. The method may further include positioning a focusing component adjacent the planar grid electrode. The focusing component may be a focusing electrode coupled to the planar ion source, a focusing electrode coupled to an independent variable power source, a focusing reflective surface, or a magnetic field generator. The planar ion source may include a planar array of field ionization nano-tips, and may further include a planar grid electrode that is operable to generate an electric field at the array of field ionization nano-tips. The nano-tips may be formed by carbon nanofibers, tungsten, molybdenum, chromium, or a combination thereof.

An illustrative method of operating the above-described neutron generator includes ionizing a gas within the vacuum chamber near the planar ion source. The method also includes energizing a planar ion source that ionizes gas in close proximity to a planar array of nano-tips, resulting in the generation of an ion beam. Generating ions to form the ion beam may include applying a voltage pulse to the planar ion source to create an electric field on the order of 20 v/um causing ionization of ionizable gas at a gas reservoir. The method may further include applying a voltage differential across the vacuum chamber to accelerate ions toward a target and target rod, thereby generating neutrons from the target.

According to another embodiment, a method may include steps for using the neutron generator for logging information about a formation. The method may include deploying a logging tool having a neutron generator into a borehole. The method may also include energizing, within the neutron generator, a planar ion source comprising nano-tips located on a planar surface extending perpendicular to and about a central axis between a getter and a target rod of the neutron generator. Further, the method may include ionizing an ionizable gas proximate the nano-tips creating ions and accelerating the ions to bombard a target located at one end of the target rod located along the central axis of the cylindrical housing thereby generating neutrons. The method may also include transmitting the neutrons from the neutron generator into the formation surrounding the borehole and receiving signal measurements related to the transmitted neutrons at a sensor in the logging tool.

In another embodiment, a downhole neutron generator includes a housing, a gas reservoir disposed within the housing, a target rod disposed within the housing and having a longitudinal axis aligned with a central axis of the housing, a target disposed on a surface of the target rod facing the gas reservoir, and a planar ion source adjacent to the gas reservoir and disposed between the target and the gas reservoir. The planar ion source includes a planar array of field ionization nano-tips. The array of field ionization nano-tips includes composite nano-tips that include a tungsten base attached to substrate and a carbon nano-tip molecularly formed on the end of tungsten base.

In another embodiment, a downhole neutron generator includes a housing, a gas reservoir disposed within the housing, a target rod disposed within the housing and having a longitudinal axis aligned with a central axis of the housing, a target disposed on a surface of the target rod facing the gas reservoir, and a planar ion source adjacent to the gas reservoir and disposed between the target and the gas reservoir. The planar ion source includes a planar array of field ionization nano-tips. The array of field ionization nano-tips includes nano-tips formed by carbon nano-tubes.

It should be apparent from the foregoing that embodiments of an invention having significant advantages have been provided. While the embodiments are shown in only a few forms, the embodiments are not limited but are susceptible to various changes and modifications without departing from the spirit thereof.

The disclosure may also be understood to include at least the following clauses:

Clause 1: A downhole neutron generator comprising a housing; a gas reservoir disposed within the housing; a target rod disposed within the housing and having a longitudinal axis aligned with a central axis of the housing, a target disposed on a surface of the target rod facing the gas reservoir; and a planar ion source adjacent to the gas reservoir and disposed between the target and the gas reservoir.

Clause 2: The neutron generator of clause 1, wherein the planar ion source comprises: a planar field ionization array that is offset from the target and perpendicular to the longitudinal axis of the target rod; and a planar grid electrode disposed on the planar field ionization array and facing the target.

Clause 3: The neutron generator of clause 2, further comprising: a gas control electrode coupled to a heat filament disposed within the gas reservoir to generate deuterium gas and tritium gas by controlling temperature.

Clause 4: The neutron generator of any of clauses 1-3, further comprising: an ionization electrode electrically coupled to the planar grid electrode; and an electric field resulting from a negative voltage being applied to the planar grid electrode.

Clause 5: The neutron generator of any of clauses 1-4, further comprising a focusing component, wherein the focusing component is selected from the group consisting of a focusing electrode coupled to the planar ion source, a focusing electrode coupled to an independent variable power source, a focusing reflective surface, and a magnetic field generator.

Clause 6: The neutron generator of any of clauses 1-5, wherein the planar ion source comprises a planar array of field ionization nano-tips.

Clause 7: The neutron generator of clause 6, wherein the planar ion source further comprises a planar grid electrode operable to generate an electric field at the array of field ionization nano-tips.

Clause 8: The neutron generator of clause 6, wherein the nano-tips comprise at least one of carbon nanofibers, tungsten, molybdenum, chromium, and a combination thereof.

Clause 9: The neutron generator of any of clauses 1-8, wherein the target and at least a portion of the target rod are encapsulated by a suppressor.

Clause 10: The neutron generator of any of clauses 1-9, wherein the planar ion source is operable to produce an ion beam with at least 50% monatomic deuterium and tritium ions.

Clause 11: The neutron generator of any of clauses 1-10, further comprising a controller operable to switch the neutron generator between an on state and an off state at a switching time of less than 1 micro second.

Clause 12: A method of manufacturing a neutron generator, the method comprising: providing a housing that includes a vacuum chamber and a head unit; providing a target rod along a central axis of the neutron generator inside the vacuum chamber of the neutron generator at a first end; providing a gas reservoir along the central axis inside the vacuum chamber at a second end opposite the first end; and providing a planar ion source between the gas reservoir and target rod about the central axis.

Clause 13: The method of clause 12, wherein, the planar ion source comprises field ionization nano-tips on a planar surface of the planar ion source, the planar surface being perpendicular to the central axis such that the nano-tips extend parallel to the central axis toward the target rod.

Clause 14: The method of any of clauses 12-13 further comprising: concentrically positioning the target rod along the central axis; and concentrically positioning the planar ion source about the central axis facing the target rod.

Clause 15: A method of operating a neutron generator for logging information, the method comprising: deploying a logging tool having a neutron generator into a borehole; energizing, within the neutron generator, a planar ion source comprising nano-tips located on a planar surface extending perpendicular to and about a central axis of the neutron generator between a gas reservoir and, and a target rod within the neutron generator; ionizing an ionizable gas proximate the nano-tips creating ions; and accelerating the ions to bombard a target adjacent to the target rod located along the central axis thereby generating neutrons.

Clause 16: The method of clause 15, further comprising: transmitting the neutrons from the neutron generator into the formation surrounding the borehole; and receiving signal measurements related to the transmitted neutrons at a sensor in the logging tool.

Clause 17: The method of any of clauses 15-16, wherein ionizing the ionizable gas comprises: pulsing a negative voltage to the planar ion source to create an electric field on the order of 20 v/um, the electric field causing ionization of the ionizable gas.

Clause 18: The method of any of clauses 15-17 further comprising: concentrically positioning the target rod along the central axis; and concentrically positioning the planar ion source about the central axis.

Clause 19: The method of any of clauses 15-18 wherein the ionizable gas comprises at least one of a deuterium gas, a tritium gas, and a combination thereof.

We claim:

1. A downhole neutron generator comprising:
   a housing;
   a gas reservoir disposed within the housing;
   a target rod disposed within the housing and having a longitudinal axis aligned with a central axis of the housing,
   a target disposed on a surface of the target rod facing the gas reservoir;
   a planar ion source adjacent to the gas reservoir and disposed between the target and the gas reservoir; and
   a focusing component selected from the group consisting of a focusing electrode coupled to an independent variable power source, a focusing reflective surface, a magnetic field generator, and any combination thereof.

2. The neutron generator of claim 1, wherein the planar ion source comprises:
   a planar field ionization array that is offset from the target and perpendicular to the longitudinal axis of the target rod; and
   a planar grid electrode disposed on the planar field ionization array and facing the target.

3. The neutron generator of claim 2, wherein the focusing component is adjacent to the planar grid electrode.

4. The neutron generator of claim 2, further comprising:
a gas control electrode coupled to a heat filament disposed within the gas reservoir to generate deuterium gas and tritium gas by controlling temperature.

5. The neutron generator of claim 2, further comprising: an ionization electrode electrically coupled to the planar grid electrode; and an electric field resulting from a negative voltage being applied to the planar grid electrode.

6. The neutron generator of claim 1, wherein the planar ion source comprises a planar array of field ionization nano-tips.

7. The neutron generator of claim 6, wherein the planar ion source further comprises a planar grid electrode operable to generate an electric field at the array of field ionization nano-tips.

8. The neutron generator of claim 6, wherein the nano-tips comprise at least one of carbon nanofibers, tungsten, molybdenum, chromium, and a combination thereof.

9. The neutron generator of claim 1, wherein the target and at least a portion of the target rod are encapsulated by a suppressor.

10. The neutron generator of claim 1, wherein the planar ion source is operable to produce an ion beam with at least 50% monatomic deuterium and tritium ions.

11. The neutron generator of claim 1, further comprising a controller operable to switch the neutron generator between an on state and an off state at a switching time of less than 1 micro second.

12. A method of manufacturing a neutron generator, the method comprising:
providing a housing that includes a vacuum chamber and a head unit;
providing a target rod along a central axis of the neutron generator inside the vacuum chamber of the neutron generator at a first end;
providing a gas reservoir along the central axis inside the vacuum chamber at a second end opposite the first end;
providing a planar ion source between the gas reservoir and target rod about the central axis; and
providing a focusing component selected from the group consisting of a focusing electrode coupled to an independent variable power source, a focusing reflective surface, a magnetic field generator, and any combination thereof.

13. The method of claim 12, wherein the planar ion source further comprises:
a planar field ionization array that is perpendicular to the longitudinal axis of the target rod; and
a planar grid electrode disposed on the planar field ionization array; wherein the planar grid electrode is disposed adjacent to the focusing component.

14. The method of claim 12, wherein, the planar ion source comprises field ionization nano-tips on a planar surface of the planar ion source, the planar surface being perpendicular to the central axis such that the nano-tips extend parallel to the central axis toward the target rod.

15. The method of claim 12 further comprising:
concentrically positioning the target rod along the central axis; and
concentrically positioning the planar ion source about the central axis facing the target rod.

16. A method of operating a neutron generator for logging information, the method comprising:
deploying a logging tool having a neutron generator into a borehole; wherein the neutron generator comprises:
a housing;
a gas reservoir disposed within the housing;
a target rod disposed within the housing and having a longitudinal axis aligned with a central axis of the housing,
a target disposed on a surface of the target rod facing the gas reservoir;
a planar ion source adjacent to the gas reservoir and disposed between the target and the gas reservoir and comprising a planar array of field ionization nano-tips extending perpendicular to and about a central axis of the neutron generator between the gas reservoir and the target rod within the neutron generator; and
a focusing component selected from the group consisting of a focusing electrode coupled to an independent variable power source, a focusing reflective surface, a magnetic field generator, and any combination thereof;
energizing within the neutron generator, the planar ion source;
ionizing an ionizable gas proximate the nano-tips creating ions;
focusing the ions with the focusing component in a direction that is parallel to the central axis of the neutron generator; and
accelerating the ions to bombard the target.

17. The method of claim 16, further comprising:
transmitting the neutrons from the neutron generator into the formation surrounding the borehole; and
receiving signal measurements related to the transmitted neutrons at a sensor in the logging tool.

18. The method of claim 16, wherein ionizing the ionizable gas comprises:
pulsing a negative voltage to the planar ion source to create an electric field on the order of 20 v/um, the electric field causing ionization of the ionizable gas.

19. The method of claim 16 further comprising:
concentrically positioning the target rod along the central axis; and
concentrically positioning the planar ion source about the central axis.

20. The method of claim 16 wherein the ionizable gas comprises at least one of a deuterium gas, a tritium gas, and a combination thereof.

* * * * *